Mar. 27, 1923.
A. BROADMEYER.
RULING APPARATUS.
FILED SEPT. 22, 1919.
1,449,376.
10 SHEETS—SHEET 8.
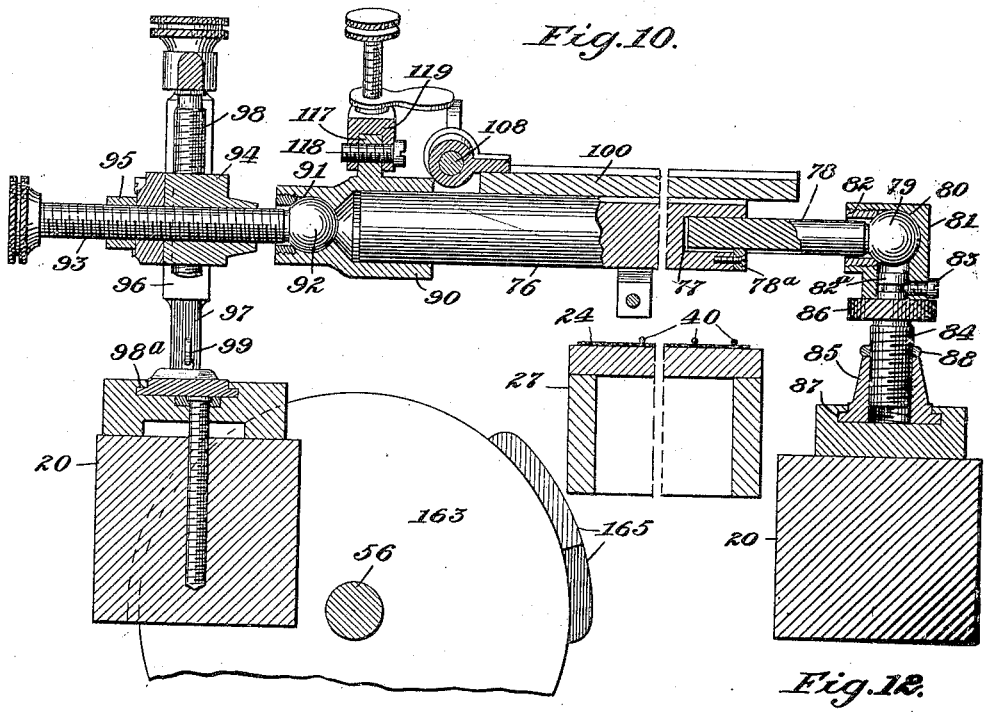
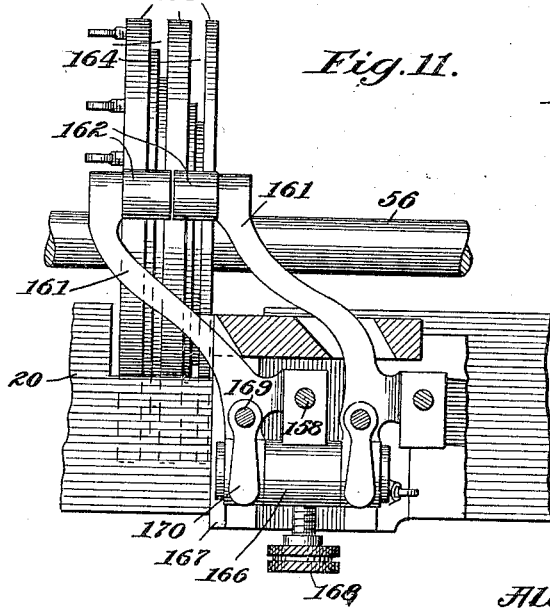
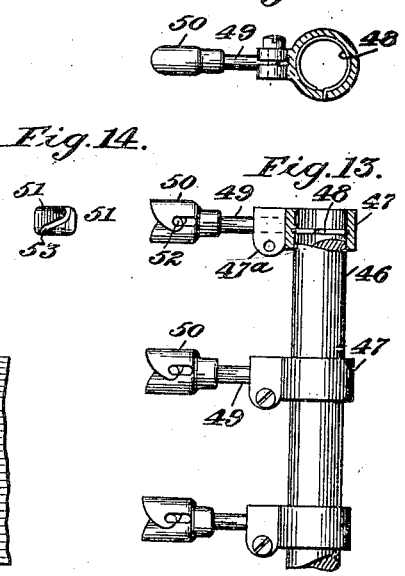
Inventor:
Albert Broadmeyer, Mar. 27, 1923.

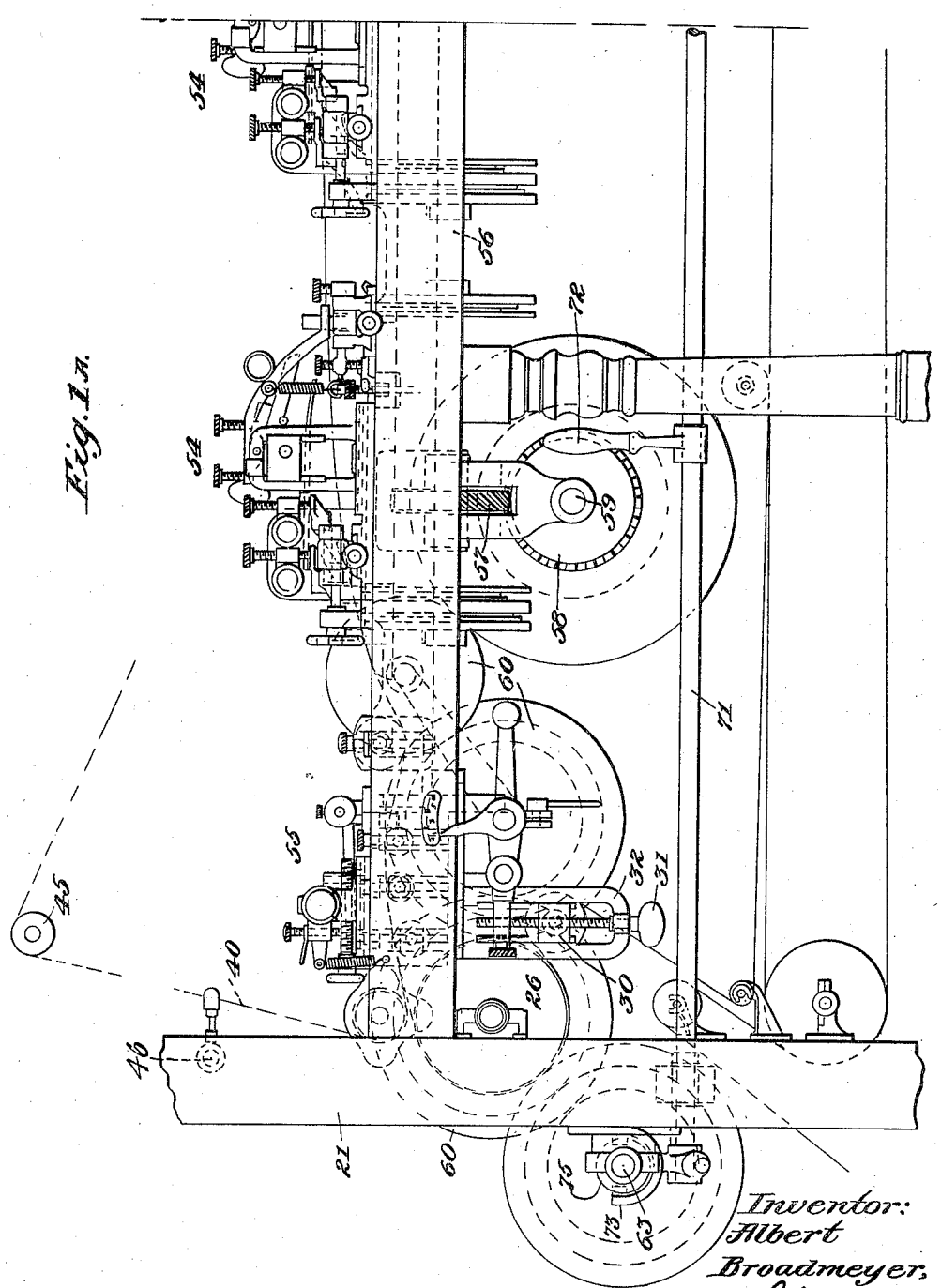

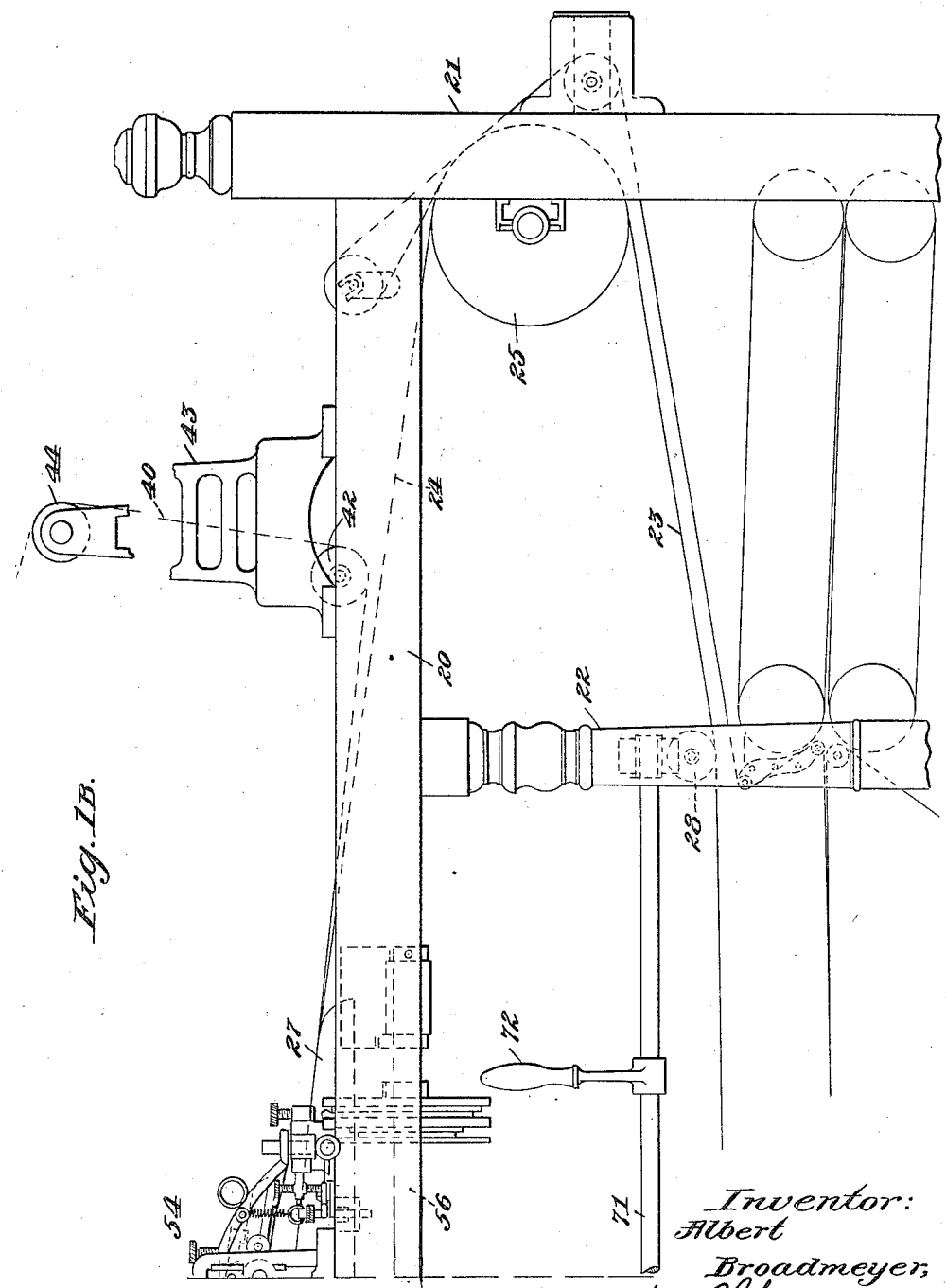

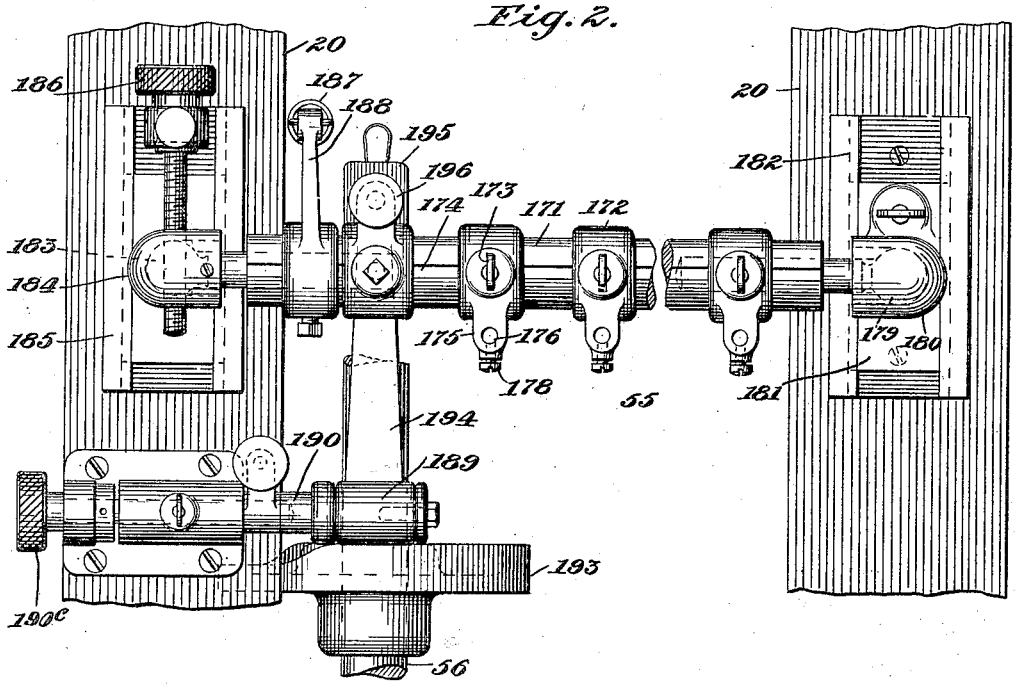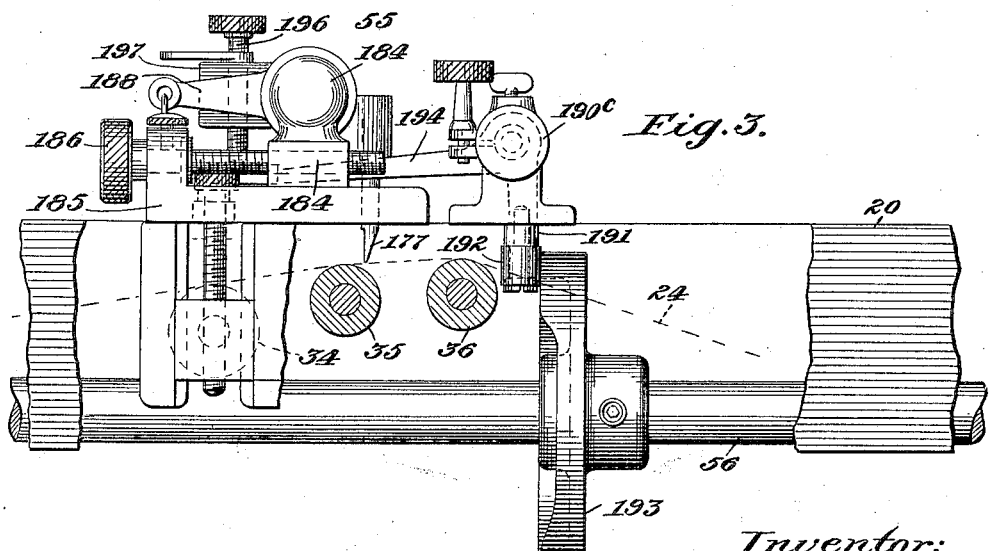

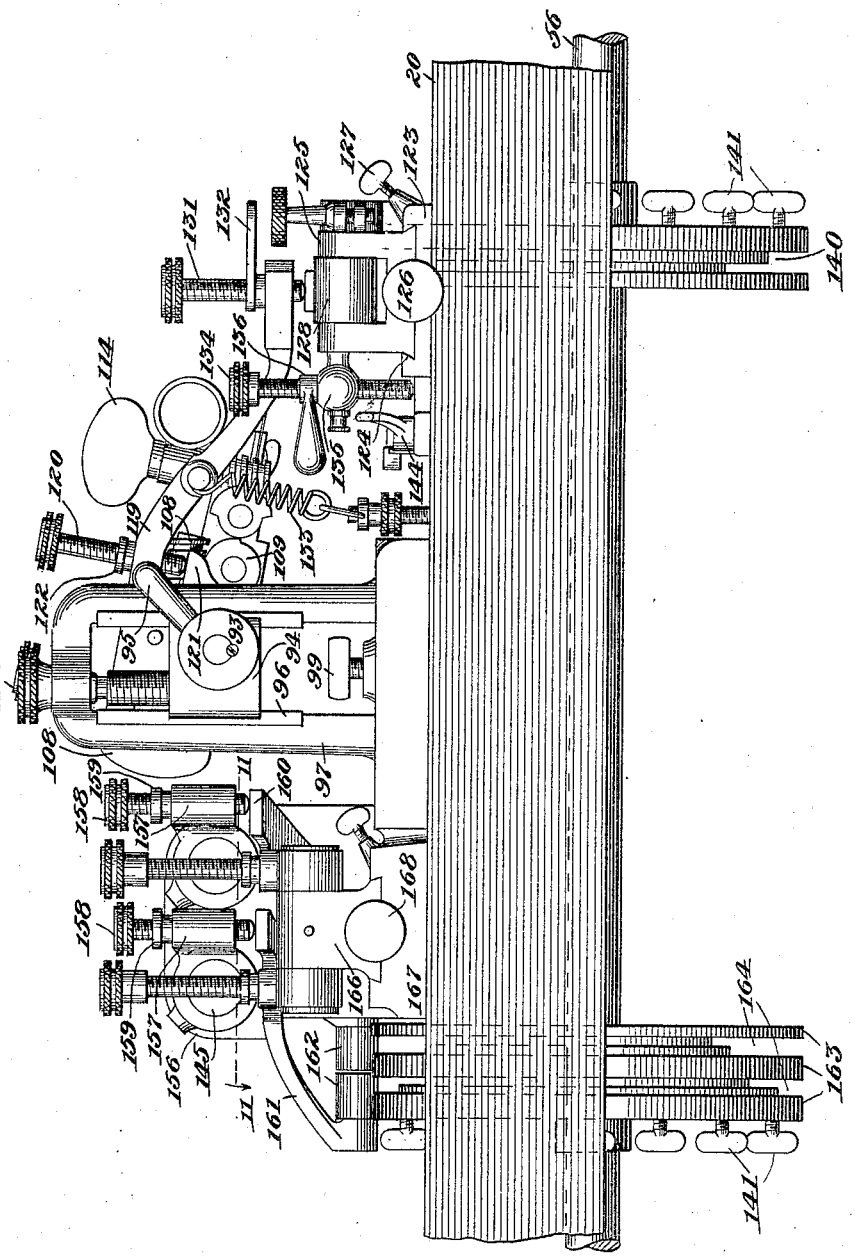

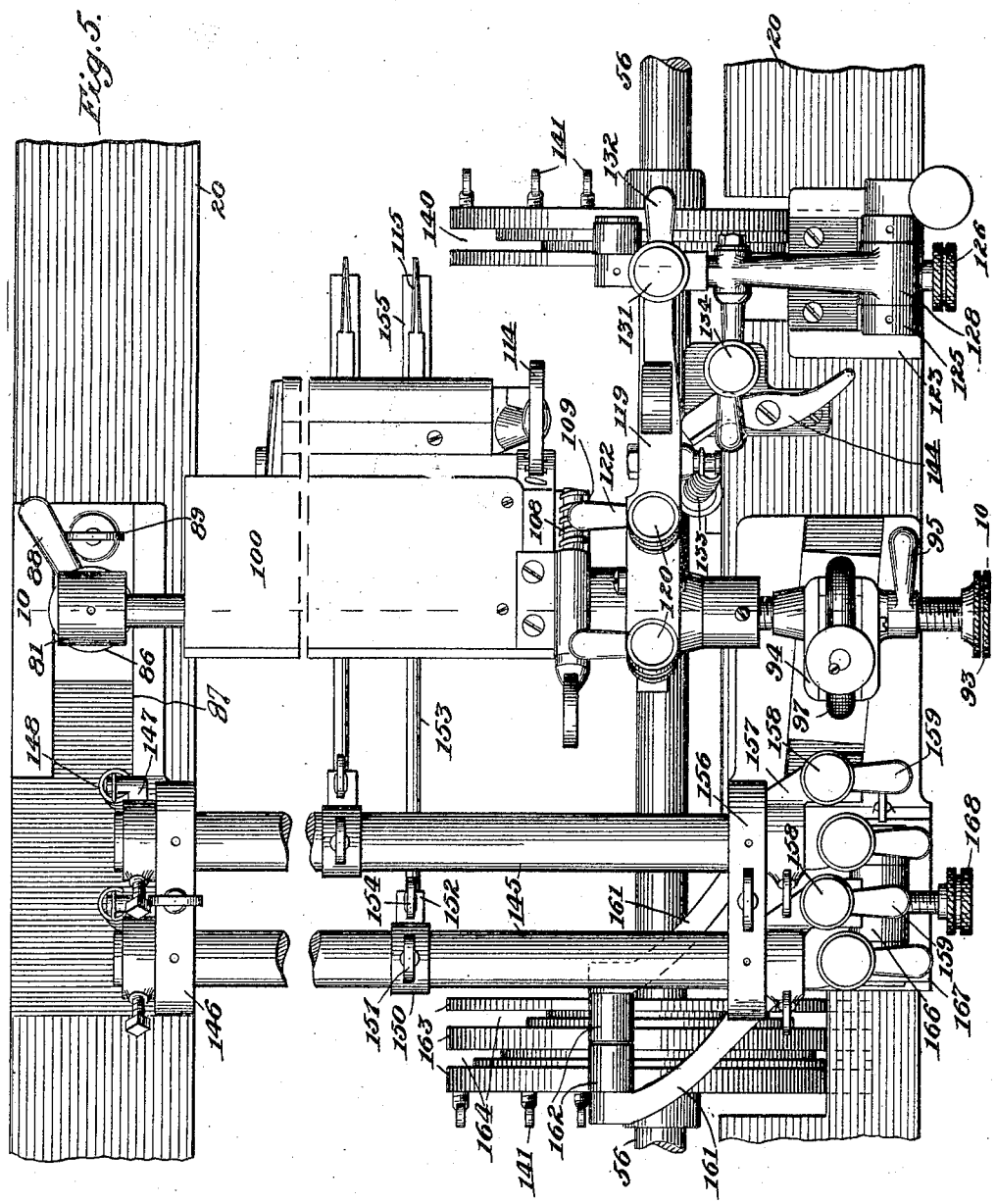

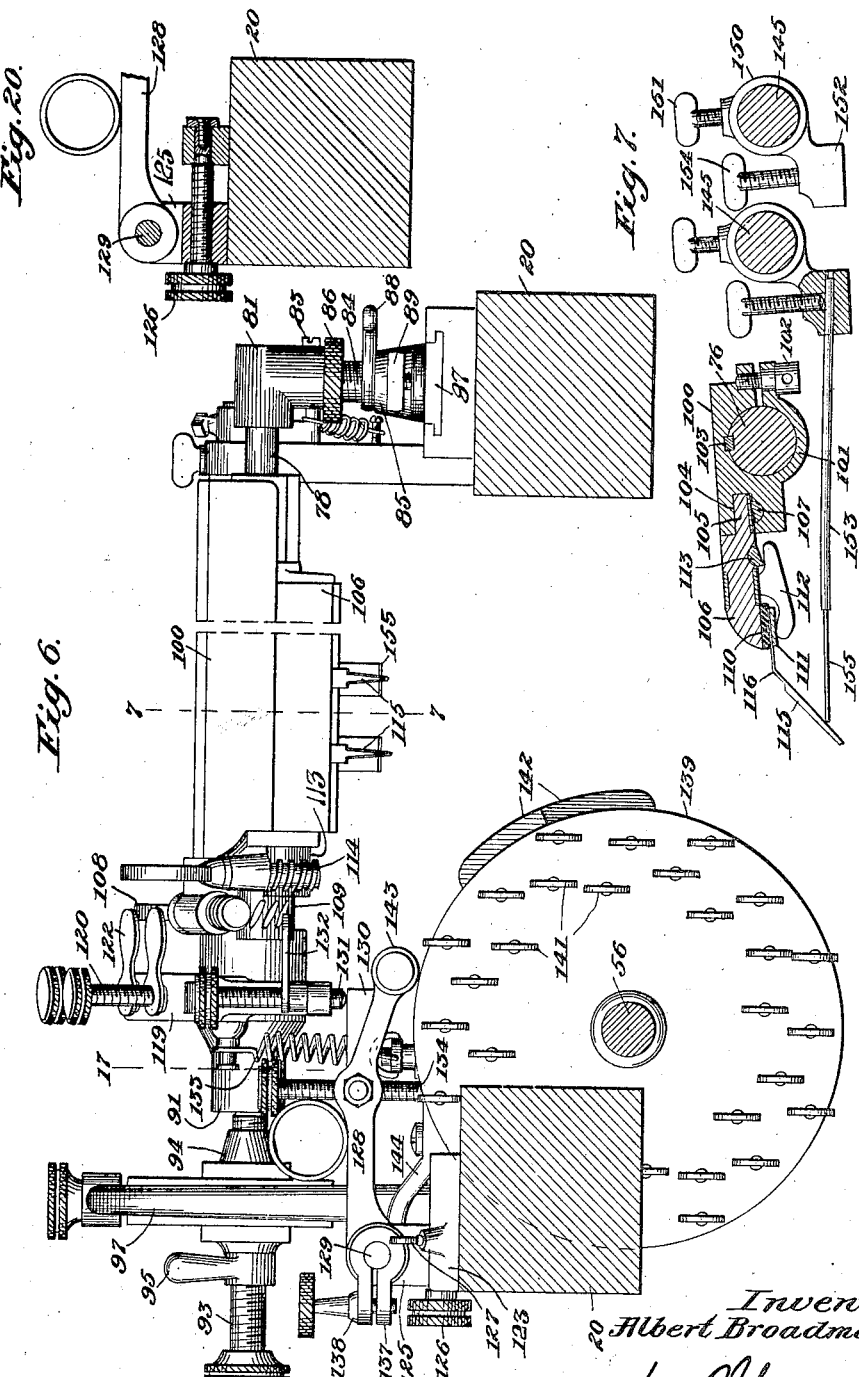

A. BROADMEYER.
RULING APPARATUS.
FILED SEPT. 22, 1919.

Inventor:
Albert Broadmeyer,
by
Att'y.

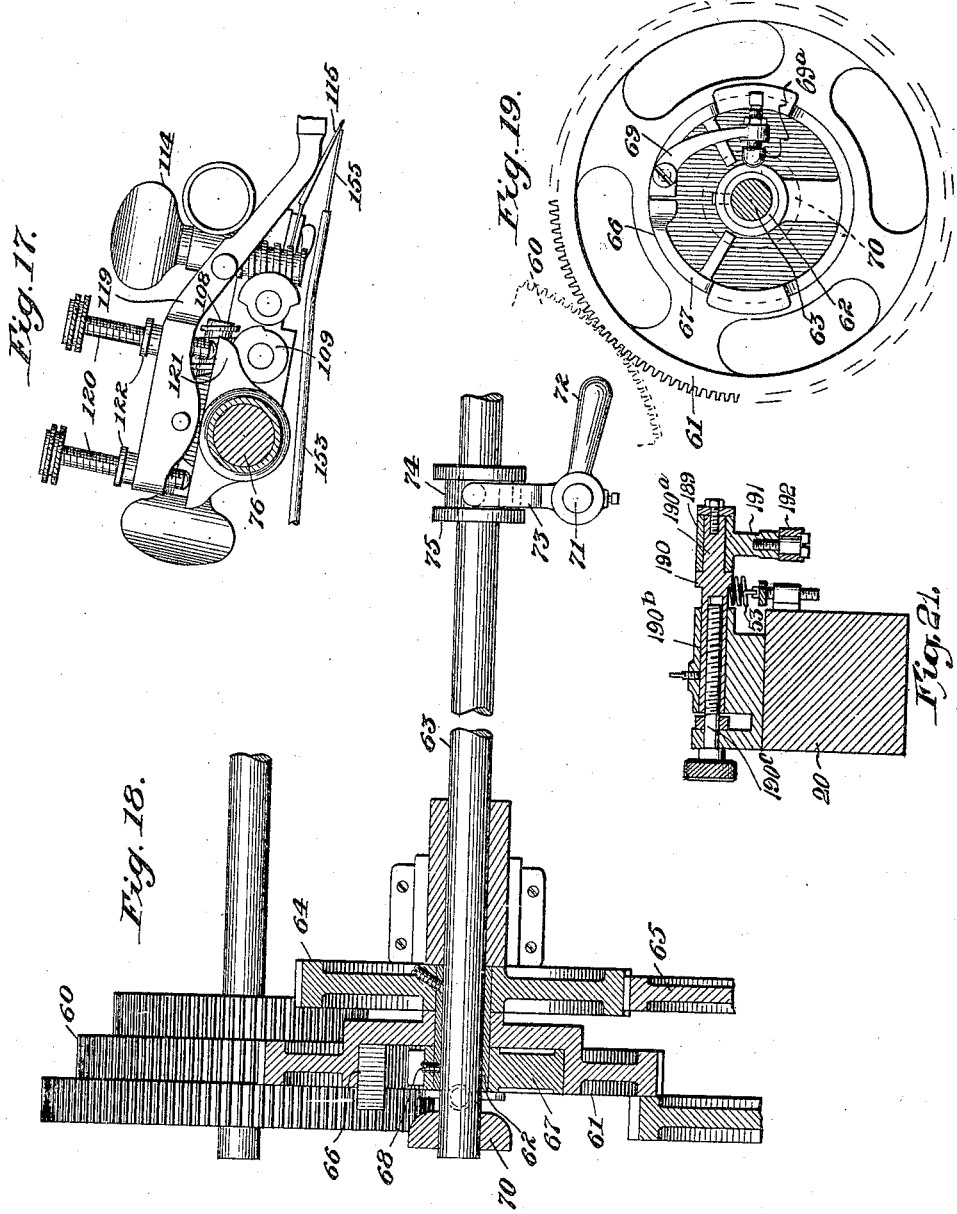

Patented Mar. 27, 1923.

1,449,376

UNITED STATES PATENT OFFICE.

ALBERT BROADMEYER, OF HARRISBURG, PENNSYLVANIA, ASSIGNOR TO W. O. HICKOK MANUFACTURING COMPANY, OF HARRISBURG, PENNSYLVANIA, A CORPORATION OF PENNSYLVANIA.

RULING APPARATUS.

Application filed September 22, 1919. Serial No. 325,368.

*To all whom it may concern:*

Be it known that I, ALBERT BROADMEYER, a citizen of the United States, residing at Harrisburg, in the county of Dauphin and State of Pennsylvania, have invented certain new and useful Improvements in Ruling Apparatus, of which the following is a specification.

The present invention relates more particularly to apparatus for ruling lines upon paper or the like.

In apparatus of this kind with which I am acquainted, trains of gearing have been utilized to transmit motion to the various cooperating instrumentalities, and notwithstanding the care with which the gears are constructed, there is often a certain amount of lost motion or loose play which destroys the proper synchronism of the parts with consequent defective product.

One of the principal objects of the present invention is to eliminate these trains of gearing, and provide in lieu thereof direct driving mechanism that insures the proper coaction of the parts, at the same time lessening the intricacy and simplifying the operations.

A further and important object is to provide mechanism that has a wide variation and range of adjustment, both in individual elements and in an assemblage of parts, whereby exceedingly accurate and also intricate results of varied character can be obtained.

An embodiment of the invention that at present is considered the preferable one, is illustrated in the accompanying drawings, wherein:—

Figures 1A and 1B together are a side elevation of the ruling machine.

Figure 2 is a plan view of the gage or gate controlling the introduction of the paper.

Figure 3 is a sectional view showing said gage or gate in end elevation.

Figure 4 is an end elevation of one of the ruling or marking mechanisms.

Figure 5 is a top plan view of the same,

Figure 6 is a rear elevation of the ruling or marking mechanism shown in Figures 4 and 5, Figure 7 is a detail sectional view on the line 7—7 of Figure 6.

Figure 15:
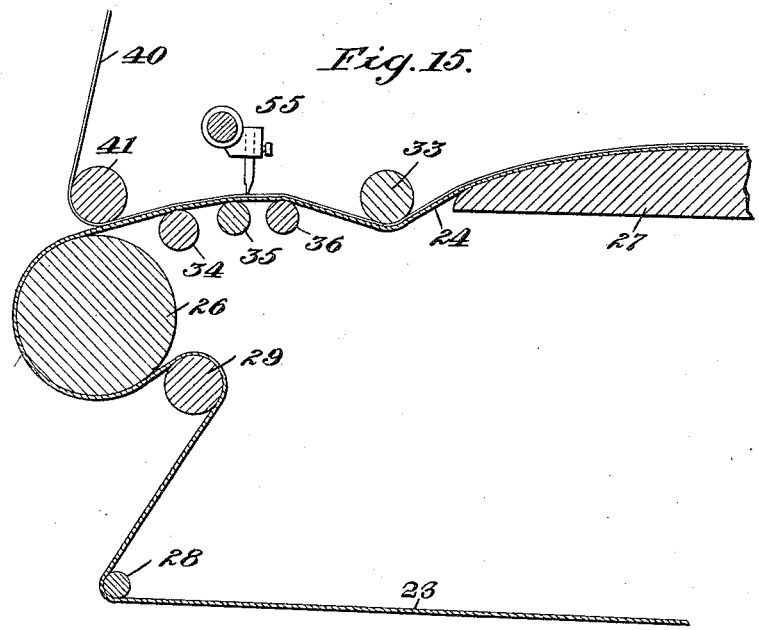

Figure 10 is a longitudinal sectional view substantially on the line 10—10 of Figure 5, Figure 11 is a horizontal sectional view on the line 11—11 of Figure 4, Figure 12 is a detail sectional view through one of the cord guides, Figure 13 is a plan view of certain of the cord guides, one being illustrated in section, Figure 14 is an end elevation of one of the cord guide heads, Figure 15 is a detail longitudinal sectional view through the inlet end of the machine, including the gage or gate.

Figure 16:
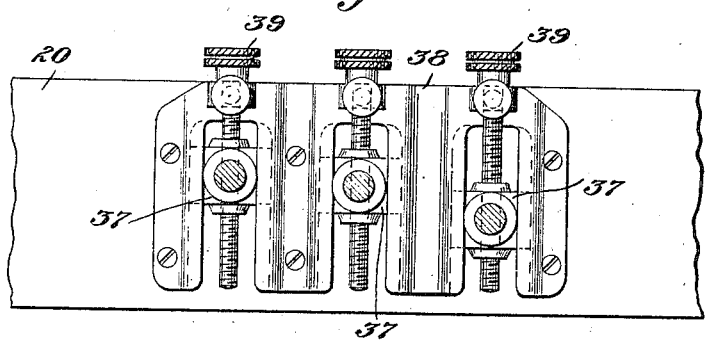

Figure 16 is a detail cross sectional view showing the boxes, for the rollers at the gage or gate, Figure 17 is a detail sectional view illustrating the crank arm mounting for a pen beam or marker support, Figure 18 is a detail sectional view of the clutch mechanism that controls the operation of the machine, Figure 19 is an end elevation of the clutch mechanism shown in Figure 18, Figure 20 is a detail sectional view of the mounting for the rocker arm 128, and showing the means by which it is adjusted, Figure 21 is a detail sectional view of the mounting for the bell crank 189.

Similar reference numerals designate corresponding parts in all the figures of the drawings.

In the embodiment disclosed, a suitable frame is employed, including longitudinal beams 20 and end standards 21, with intermediate legs 22. A work conveyer in the form of an endless belt 23 is employed, the upper stretch 24 of which extends longitudinally within the frame, and constitutes a carrier for the sheets of paper to be ruled. This belt passes at its rear end around a roller 25 suitably journaled in the rear end of the machine, and at the front end of said machine also passes around a driving cylinder or roller 26. The upper stretch 24 passes over the upper convexed face of a stationary table 27. Suitable guiding rollers 28 are employed for the lower stretch of the belt, and in order that the said belt may contact with a considerable portion of the cylinder or driving roller 26, a tension roller 29 engages it adjacent to said drum, the roller 29 being journaled in boxes 30, one of which is shown in Figure 1ᴬ, said boxes being adjustable by screws 31 engaging therewith and journaled in the lower ends of guide brackets 32 in which the boxes are slidable. To insure the belt lying flat upon the table 27, and to hold the paper absolutely firm on the belt, a roller 33 is placed in advance of said table in a slightly lower plane than the front edge of the same, and other rollers 34, 35, and 36 are interposed between the roller 26 and the roller 33 to cause the portion of the belt between said rollers 26 and 33 to have a generally upwardly convexed path, causing a gradually increased grip upon the paper sheets. The said rollers 34, 35 and 36 are journaled in boxes 37, one set of which is illustrated in Figure 16, these boxes being slidable in guide brackets 38 secured to the inner sides of the longitudinal beams 20, the boxes being vertically adjustable by means of screws 39 having threaded engagements therewith.

To hold the paper properly upon the conveyer belt 24, a plurality of endless cords 40 are employed, these cords passing at the front end of the machine around a roller 41 placed above the roller 26, thence passing under the roller 33 and under a roller 42 at the rear portion of the machine, but in advance of the roller 25. Standards 43 extending above the roller 42, support a guide roller 44 around which the cords 40 pass, and at the front of the machine is another elevated guide roller 45 over which said cords pass. These various rollers have smooth cylindrical surfaces, so that the cords may operate around any portions of the same.

To insure any desired locations for the cords individual guides are employed that are more particularly illustrated in Figure 1ᴬ and Figures 12, 13 and 14. The standards 21 support between them a horizontal rod 46, and on this rod are slidably mounted the said guides. Each guide consists of a collar 47 surrounding the rod and containing a friction spring 48 that snugly embrace and thus grip the rod sufficiently to hold the collar and guide at any point desired. These collars carry outstanding compressible clamps 47ᵃ in which are detachably fitted stems 49. The stems are provided with terminal heads 50, the said heads being in the form of two reversely disposed coacting hooks 51 that thus provide a guideway 52 between them with a tortuous mouth 53. It will be understood that the endless cords slidably pass through the guideways 52, and can be introduced or removed therefrom by reason of the said mouths 53, yet when in place, are held against accidental detachment. It will also be evident that the guides can be shifted along the rod 46, to any point desired, and the cords will be correspondingly positioned.

The present machine employs a plurality of sets or batteries of ruling pens or marking implements. The number of such sets can be varied as desired. In the present embodiment, each is designated generally by the reference numeral 54. The paper to be ruled is introduced between the belt 24 and cords 40 at the roller 26 and roller 41 shown more particularly in Figure 1ᴬ and Figure 15. The period at which each sheet of paper is allowed to enter the machine and pass to the ruling mechanisms is determined by an automatically operated gage or gate designated generally 55. It will be evident that it is highly desirable at all times to obtain accurate register of the ruling instrumentalities, and therefore their absolute cooperation is essential. This is true in all events, whether the ruling operations are simple or complex, and therefore in the present case direct driving mechanism in which the danger of variable movement is practically eliminated, has been provided.

To this end, a single driving shaft 56 extends longitudinally within the frame adjacent to one side of the same, the said driving shaft having a mitre gear 57 thereon, which is in mesh with another gear 58 mounted on a transverse shaft 59. The shaft 59 is driven through a train of gearing 60 which it is believed to be unnecessary to describe in detail in the present structure.

The control of the machine, as a whole, however, is an important feature, and is illustrated more especially in Figures 1ᴬ, 1ᴮ and 18. The last member of the train of gearing 60 is in mesh with a gear wheel 61 loosely mounted on a sleeve 62 that is in turn loosely journaled on a shaft 63. The sleeve 62 has fixed thereto another gear 64 meshing with a gear 65 that is driven by a suitable motor (not shown). The gear wheel 61 has a recessed portion 66 in which is located an expansible spring friction band 67. This band is fixed to the sleeve 62, as shown at 68, and a lever 69 fulcrumed on one end of the band and bearing against the other end, has a tail-piece 60ᵃ in the path of movement of an abutment cone 70 fastened to the shaft 63. Therefore when the shaft 63 is moved longitudinally the cone 70 will strike the tail-piece 69ᵃ, turn the lever and cause it to bear against the adjacent end of the band 67. This will spread the band into frictional engagement with the peripheral wall of the recess 66 of the gear wheel 61.

Journaled longitudinally in the frame beneath the longitudinal driving shaft 56 is an operating rock shaft 71 having a plurality of handles 72 thereon. The said shaft 71 has also fixed to its front end a yoke 73 that is engaged in the groove 74 of a collar 75 fast to the shaft 63. By swinging the handle 72 in one direction, it will be evident that the shaft 63 will be moved longitudinally, and the cone 70 will be correspondingly moved against the lever 69, so that the band 67 is expanded against the outer wall of the recess 66, thereby gripping the gear 61 to the sleeve 62, and if said sleeve is being rotated through the gearing 65 and 64, it will be evident that this motion will be transmitted to the train of gearing 60. The shaft 59 will thus be rotated, and through the mitre gears 58 and 57, the main driving shaft 56 will be operated. If the handles are moved in the opposite direction, the clutch band 67 will be released and the mechanism will come to a standstill. It will be understood that the train of gearing effects the operation of the roller 26, and consequently the conveyer belt and cords. The driving shaft 56 directly effects the operation of the gage or gate 55, and the different sets of marking implements 54.

Referring now to the ruling or marking mechanisms. As in the present embodiment these are duplicates, a description of one will suffice for all.

A rock shaft 76 extends across the machine above the table and work-conveying machine. One end of this rock shaft has a longitudinal socket 77 therein that slidably receives a pintle 78. A key 78ª prevents the relative rotation between the rock shaft and pintle. The outer end of the pintle is provided with a ball 79 journaled in the socket 80 of a box 81. A collar 82 retains the ball in the socket. The box 81 is journaled on the upper reduced end 82ª of an extensible standard, being retained thereon by a screw 83. The extensible standard consists of a screw 84 threaded into a base 85, the said screw having a knurled flange 86 by which it can be easily rotated. The base 85 is slidable in a guideway 87 fixed longitudinally upon the rear frame beam 20, as illustrated in Figures 5, 6 and 10. The screw 84 is ordinarily held against movement by a lock nut 88, and the base 85 is normally fixed against sliding movement by a set screw 89. The opposite or front end of the rock shaft is fixed in a sleeve 90 having in its outer end a socket 91 that receives a ball 92 formed upon the inner end of a supporting and adjusting screw 93. This screw is threaded through a box 94 and is normally held against movement by a lock nut 95. The box 94 is vertically slidably in the guideway 96 of a standard 97, its vertical position being secured and maintained by a screw 98 threaded into said boxing and journaled in the top of the standard 97. The standard 97 is slidably mounted in a guideway 98ª fixed longitudinally on the front longitudinal beam 20 of the frame and is held against such movement by a set screw 99.

Mounted to slide longitudinally upon the rock shaft 76 is a marker support in the form of a beam 100 having clamps 101 embracing the rock shaft, and being made to grip the same by screws 102. The beam 100 is held against rotary movement with respect to the rock shaft 76 by suitable keys 103 (see Figure 7). One longitudinal edge of the beam 100 is provided with a longitudinal groove 104 to receive the tongue 105 of a pen holder or clamp 106. The tongue 105 is held in the groove 104 by a half-round gripping rock shaft 107 journaled longitudinally in the beam 100 at one side of the groove 104 and adapted to enter said groove, and thus grip the tongue. The rock shaft 107 is actuated at its front end by a worm 108 journaled on the beam and engaging a worm wheel 109 fixed to said rock shaft 107.

The pen holder 106 consists of a beam having a gripping jaw 110 with which cooperates a movable jaw 111, the latter jaw being actuated by levers 112 turned by a rock shaft 113. The rock shaft 113 is actuated at one end through the medium of a worm gear 114. The pens may be of any desired or well known construction, and any number may be gripped between the jaws 110 and 111. The pens shown are designated 115, and include resilient shanks 116 that are placed between the jaws and secured thereby.

To those skilled in the art, it will be evident that when in operation the pens rest upon the sheets carried beneath the same by the belt 24 and cords 40, these pens being elevated from the work upon the movement of the rock shaft 76 in one direction and returned to operative positions upon the movement of the rock shaft in an opposite direction. The entire set of pens can also be adjusted transversely of the work by shifting the beam 100 longitudinally along the shaft 76.

The following mechanism is employed for effecting the operation of the rock shaft. The sleeve 90 to which the said rock shaft 76 is fixed is provided with an upstanding ear 117, and pivoted thereon, as shown at 118, is a crank arm 119. The crank arm is ordinarily fixed against its pivotal movement on the sleeve by adjusting and holding screws 120 threaded through the crank arm 119 on opposite sides of its pivot, and bearing against abutments 121 formed on the sleeve 90. The screws are secured against accidental movement by lock nuts 122. Thus, it will be evident that upon the swinging of the crank arm 119, the rock shaft 76 is operated, and the beam with the pens is correspondingly moved.

Secured transversely on the front longitudinal frame beam 20 is a base plate 123 having a guideway 124 in which is slidably mounted a bracket 125. The sliding movement of this bracket is effected by means of an adjusting screw 126 journaled at its inner end in said base plate 123 and having a threaded engagement with the bracket 125. The bracket is ordinarily held against accidental displacement by a set screw 127. A rocker arm 128 has a fixed pivot 129 journaled in the upstanding ears of the bracket 125, and is provided with a bearing plate or toe piece 130 on which rests an adjusting screw 131 threaded in the free end of the crank arm 119 and held against displacement by a lock nut 132. The swinging of the rocker arm 128 obviously will effect a corresponding swinging movement of the crank arm 119. A coiled spring 133, connected to the crank arm 119, serves to hold the crank arm and rocker arm in cooperative relation, and the downward movement of the rocker arm and consequently of the crank arm is determined by a stop screw 134 threaded through a lug 135 projecting from one side of the rocker arm 128. The screw 134 is fixed by a lock nut 136. The freedom with which the rocker arm 128, and consequently the crank arm and pen marking beam can swing downwardly is determined by a friction brake 137 in the form of a split sleeve constituting an integral part of the bracket 125. This sleeve grips the pivot 129, which is fixed to the rocker arm 128. The degree of the gripping action can be varied by a contracting screw 138 forming a threaded connection between the terminals of the clamp 137.

The rocker arm is periodically actuated, and to this end, the main driving shaft 56 is provided with a cam device. This cam device consists of a disk 139 having a peripheral groove 140 in which one or more cam plates can be placed, the said plates being held by set screws 141. Thus in the embodiment illustrated, and particularly in Figure 6, an extensible cam plate is disclosed, comprising overlapping sections 142 held by certain of the thumb screws 141. The free end of the rocker arm 128 is provided with a roller 143 that rides upon the periphery of the disk 139, and consequently is periodically actuated by the cam pieces fixed to said disk. With this structure, therefore, when the mechanism is in operation, the conveyer will carry the sheets beneath the ruling pens, the latter being supplied with ink by any well known means. As the cam rotates, it will periodically rock the arm 128 and transmit this motion to the pen-supporting beam, thus carrying the pens into and out of engagement with the paper. To hold the pens out of action, a swinging supporting latch 144 is provided that can be moved to a position beneath the stop screw 134, thereby holding the arm 128 in elevated position, with the roller 143 out of the path of the cam plates 142.

As will be evident, the different adjusting elements permit a wide range of variations in the positions and actions of the pens. For example, by adjusting the support 125, which carries the rocker arm transversely of the frame beam 20 on which it is mounted, the roller 143 is differently positioned with respect to the cam, thus varying the time of movement of the pen beam. The pressure with which the pens rest upon the paper can also be easily altered. The angular disposition of the pens with respect to the conveyer, and consequently with respect to the work passing beneath the pens, can be changed by moving either standard longitudinally of the frame, and furthermore either end of the pen-supporting beam can be elevated with respect to the other end, or the beam can be bodily raised and lowered. The set of pens can also be bodily shifted transversely of the conveyer. This longitudinal adjustment of the beam on the rock shaft is a particularly valuable feature, in that it permits the change of position of the entire set of pens without re-adjusting the pens individually, insuring, for example, exactly the same arrangement of lines on opposites of a sheet where the margin is reversed.

Figure 8:
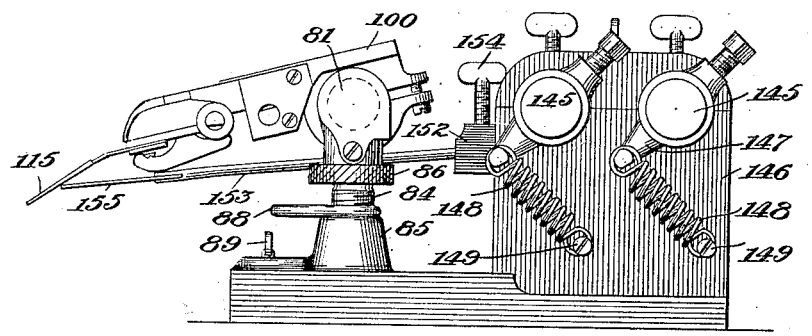
Figure 8 is an elevation of the end opposite to that shown in Figure 4.
Figure 9:
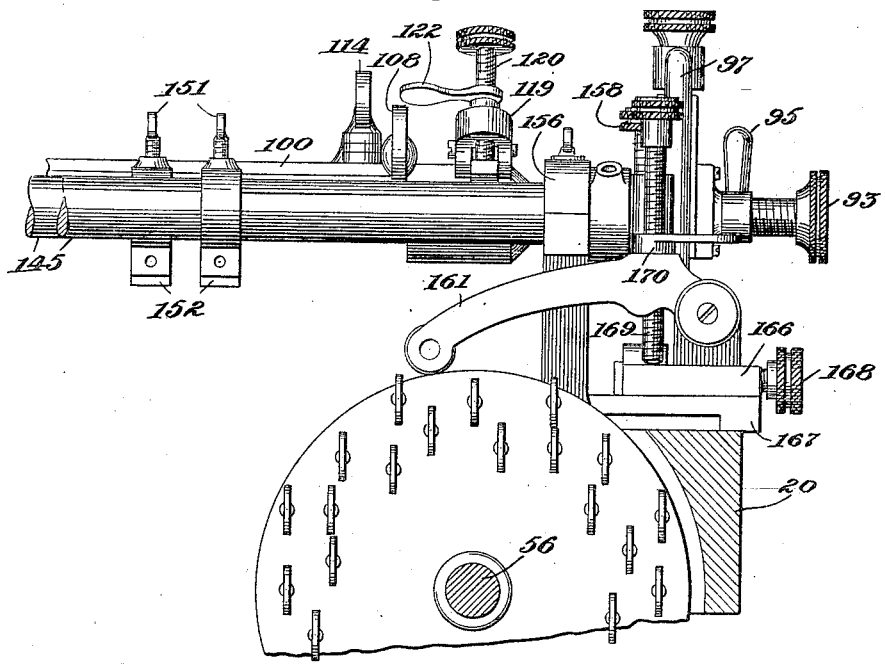
Figure 9 is a detail front elevation of the right hand portion of the mechanism shown in Figure 5.

Means are also provided for lifting one or more pens of a set without disturbing others. To this end one or more rock shafts 145 (two being shown in the present embodiment) extend longitudinally of the rock shaft 76 in advance of the same. These rock shafts, as illustrated more particularly in Figures 5 and 8, have their rear ends journaled in a supporting plate or standard 146, the terminals projecting beyond said standard and having fixed thereto crank arms 147 to which are connected coiled springs 148 fastened to the standard, as shown at 149. Slidable upon the rock shafts are collars 150 held in any desired adjustment by set screws 151, and having outstanding socketed projections 152. Stems or rods 153 detachably fitted in the sockets of the projections 152 and held therein by set screws 154, are provided with terminal plates 155 that can be placed beneath one or more of the pens 115, so as to engage and elevate the same when the rock shafts are turned.

The front ends of the rock shafts are journaled in a plate or standard 156, beyond which they project, the projecting ends carrying stub crank arms 157. These crank arms have threaded through their free terminals bearing screws 158 held against displacement by lock nuts 159 and said bearing screws rest upon the toe pieces 160 of rocker arms 161 extending beneath and offset from the rock shafts 145. The rocker arms have terminal rollers 162 that ride upon the periphery of cam disks 163 fixed to the shaft 56. The said disks have peripheral grooves 164 for receiving sets of cam plates 165 similar to the plates 142. The rocker arms 161, as shown more particularly in Figures 4, 5, 9 and 11, are journaled for independent movement on a bracket 166 that is slidable in a base plate 167 fastened to the frame beam 20. The base plate is adjusted by means of a screw 168 that is mounted to act like the screw 126, as illustrated in Figure 21. Thus the time of action of the rocker arms, and consequently of the rock shafts and the underlift devices for the pens can be altered. The downward movements of the rocker arms are determined by stop screws 169 threaded through said rocker arms and adapted to rest upon the bracket 166, the accidental displacement of the screws 169 being prevented by lock nuts 170.

It will be evident therefore, that with the mechanism disclosed the set of pens or marking elements can be elevated from the work and lowered thereon periodically, as a whole, and as desired, and any one or more of the pens less than the entire set can be separately moved through the last described mechanism.

In order to accurately gage the feed of the work to the ruling mechanism or mechanisms, the means designated generally by the reference numeral 55 is employed, and as illustrated in Figures 1A, 2 and 3 a rock shaft 171 extends transversely across the conveyer at the intake or feeding end of the machine. Slidably mounted on this rock shaft are collars 172 that are fixed against longitudinal movement and also against rotary movement by set screws 173 which engage in a key-way 174 formed in the shaft. The collars 172 have outstanding lugs 175 provided with vertical openings 176 in which are adjustably mounted stop fingers 177 held in place by set screws 178. These stop fingers, as indicated in Figure 3, are adapted to rest upon the conveyer belt and can be elevated therefrom upon the movement of the rock shaft, as will be obvious.

The rear end of the rock shaft carries a ball 179 rotatable mounted in the socket of a box 180 that is slidably mounted, as illustrated at 181, in a guideway 182 fixed upon the rear longitudinal frame beam 20. The front end of the rock shaft is also provided with a ball and socket bearing 183 in a standard 184 slidably mounted in a guideway 185 fixed longitudinally upon the front frame beam 20. The standard 184 is adjusted by means of a screw 186 journaled in an ear 185ᵃ on the guideway 185 and having a threaded engagement with the base of the standard 184.

The rock shaft is adapted to be moved to a position with the stop fingers 177 out of engagement with the belt, by a spring 187 connected to a crank arm 188 that is fixed to said rock shaft 171. It is positively moved in an opposite direction to bring the fingers into engagement with the conveyer belt by the following means. A bell crank 189 is journaled on an adjustable stem 190 mounted on the front frame beam 20. The stem 190 as shown in Figure 22 has a spindle 190ᵃ on which the bell crank is mounted and has a sliding bearing at 190ᵇ and is engaged by an adjusting screw 190ᶜ. This bell crank has a depending arm 191 provided with a terminal roller 192 that operates against a face cam 193 fixed to the main driving shaft 56. The bell crank 189 also has a substantially horizontal arm 194 extending beneath the rock shaft 171, and having its free terminal in the form of a bearing plate 195 engaged by a screw 196 that is threaded through a crank arm 197 fixed to the rock shaft 171. Therefore as the cam 193 rotates, the bell crank 189 will be periodically moved to rock the shaft 171 and cause the fingers to be depressed into engagement with the conveyer belt 24, the continued rotation in turn permitting the spring 187 to react to elevate the fingers.

It is believed that the general operation of the machine may now be made clear. Assuming that it is at a standstill, if the clutch 67 is thrown to start the train of gearing 60, the driving roller 26 will be rotated, thus causing the operation of the conveyer mechanism. The main driving shaft 56 will also be thrown into operation through the actuation of the shaft 59 and the mitre gears 58 and 57. If now sheets of paper are successively introduced between the conveyer belt 24 and the cords 40, where they are brought together, as indicated in Figure 15, each sheet will first be stopped by the gage or gate due to the depression of the fingers 177 on to the belt 24. At the proper time the cam 193 will act to permit the elevation of the fingers, thus permitting the sheets to pass on to the machine. As they move beneath the pens, they will be ruled in a manner well understood, and it will be evident that the character of the cam plates employed, with the positions of the rocker arms with respect to the cam plates and the number and character of the under-lift devices will result in certain predetermined lines. As already stated, any desired number of ruling mechanisms may be utilized, the ruled paper finally passing from the rear end of the machine, illustrated in Figure 1ᴮ, and thence to suitable drying and delivery means. As will be readily understood, the sheets may be passed through one or more times, so that either or both surfaces can be ruled, and where the opposite sides are to be correspondingly ruled with corresponding margins, it will be evident that the only adjustment necessary in ruling the reverse sides is the bodily adjustment of the pens transversely of the conveyer which as already explained can be conveniently accomplished by shifting the pen beams longitudinally upon their rock shafts.

The desirability of the various adjustments have already been outlined, and it is believed need no further exposition. One of the important features, however, of the present apparatus is the provision of a common driving medium, shown in the form of the shaft 56 that operates directly upon the various instrumentalities. The cams are all located on the same shaft, so that the danger of lost motion or loose play is practically eliminated. Consequently synchronism or the proper cooperative action of the different sets of pens with each other is insured, and this is also true with respect to the feeding or gage mechanism actuated by the same shaft. It is furthermore individually true with each ruling mechanism, in that the cam for moving the beam, as a whole, and the cam for moving the under-lift devices, are on the same shaft. The employment of the guiding means for the cords has proven exceedingly advantageous, in that the necessity for grooved rollers is thus obviated. Any desired exact position for one or more of the cords can be obtained merely by shifting its particular guide 47—50. Consequently non-interference between the pens or marking elements and the cords can in every instance be assured.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a ruling machine, the combination with ruling mechanism, of gage mechanism, conveying means for transferring the work from the gage mechanism to the ruling mechanism, an operating means for the gage mechanism, an operating means for the ruling mechanism, and relatively fixed actuating devices for the two operating means and respectively located adjacent to the gage and ruling mechanisms.

2. In a ruling machine, the combination with a frame, of work-conveying means operating longitudinally thereof, ruling mechanism and gate mechanism located transversely of the frame and conveying means, an operating means for the gate mechanism, an operating means for the ruling mechanism, actuating devices for the operating means located at the same side of the frame, and a common carrier for the operating devices at said side of the frame.

3. In a ruling machine, the combination with a frame, of work-conveying means operating longitudinally thereof, ruling mechanism and gate mechanism located transversely of the frame and conveying means, a rocker arm for the gate mechanism located at one end of the same and at one side of the frame, a rocker arm for the ruling mechanism located at one end of the same and at the same side of the frame as the first mentioned rocker arm, and cams operating on the rocker arm and located at the same side of the frame.

4. In a ruling machine, the combination with ruling mechanism, of gage mechanism, conveying means for transferring the work from the gage mechanism to the ruling mechanism, an operating means for the gage mechanism located at one end thereof, an operating means for the ruling mechanism located at one end thereof, and relatively fixed operating devices located adjacent to the ends of the gage mechanism and ruling mechanism for actuating the operating means thereof to effect the periodic movements of the gage mechanism and ruling mechanism.

5. In a ruling machine, the combination with ruling mechanism, of gage mechanism, conveying means for transferring the work from the gage mechanism to the ruling mechanism, a rocker arm for operating the gage mechanism located at one end of the same, a rocker arm for operating the ruling mechanism located at one corresponding end of the same, and fixedly connected cams for respectively moving the rocker arms and located respectively adjacent to the gage and ruling mechanisms.

6. In a ruling machine, the combination with ruling mechanism, of gage mechanism, operating mechanisms for each, and an actuating member extending transversely of the ruling and gage mechanisms and having elements for respectively moving their operating mechanisms.

7. In ruling machine, the combination with ruling mechanism, of gage mechanism, a rocker arm for each mechanism, and an actuating shaft extending transversely of the ruling and gage mechanisms and having cams for respectively moving the rocker arms.

8. In a ruling machine, the combination with a plurality of ruling mechanisms, of means for carrying the work into coaction therewith successively, an operating means for each ruling mechanism, and relatively fixed actuating devices for the respective operating means and respectively disposed adjacent to the different ruling mechanisms.

9. In a ruling machine, the combination with a plurality of ruling mechanisms, of means for carrying the work into coaction therewith successively, an operating means for each ruling mechanism, and relatively fixed devices for respectively actuating the said operating means, said operating means and actuating devices respectively being substantially duplicates and correspondingly located with relation to their ruling mechanisms operated thereby.

10. In a ruling machine, the combination with a plurality of ruling mechanisms, of means for carrying the work into coaction therewith successively, a rocker arm for each ruling mechanism located at one end thereof, a driving shaft extending adjacent to the ends of the ruling mechanisms at which the rocker arms are located, and cam devices mounted on the shaft and respectively operating the rocker arms.

11. In a ruling machine, the combination with a plurality of ruling mechanisms, of means for carrying the work into coaction therewith successively, an operating means for each ruling mechanism, a driving member disposed transversely of the ruling mechanisms, and fixedly related elements on the driving member for respectively actuating the operating means.

12. In a ruling machine, the combination with a plurality of ruling mechanisms, of means for carrying the work into coaction therewith successively, rocker arms for the mechanisms, a driving shaft extending transversely of the mechanisms, and cam elements on the shaft for operating the rocker arms.

13. In a ruling machine, the combination with a ruling mechanism, including a movable marker support and selective marker moving mechanism, of operating means for the marker support, operating means for the marker moving mechanism, and relatively fixed actuating devices for said operating means located on opposite sides of the marker support.

14. In a ruling machine, the combination with ruling mechanism including a movable marker support and selective marker moving mechanism, of operating means for the marker support, operating means for the marker moving mechanism, and devices located at one end of the marker support for respectively actuating the operating devices.

15. In a ruling machine, the combination with ruling mechanism, including an elongated movable marker support and selective marker moving mechanism, of operating means for the marker support, operating means for the marker moving mechanism, a driving shaft disposed transversely to the marker support and marker moving mechanism, and cam devices carried by the shaft and actuating the operating means.

16. In a ruling machine, the combination with ruling mechanism, including an elongated movable marker support and selective marker moving mechanism, of rocker arms for operating the marker support and the marker moving mechanism, a driving shaft disposed transversely to the marker support and marker moving mechanism, and cam devices carried by the shaft and actuating rockers.

17. In a ruling machine, the combination with ruling mechanism including a movable marker support and selective marker moving mechanism, of a gage, means for moving the work from the gage to the ruling mechanism, operating means for the gage, operating means for the marker support, operating means for the marker moving mechanism, and relatively fixed actuating devices for the several operating means located respectively adjacent to the corresponding ends of said marker support, moving mechanism and gage.

18. In a ruling machine, the combination with ruling mechanism including a movable marker support and selective marker moving mechanism, of a gage, means for moving the work from the gage to the ruling mechanism, operating means for the gage, operating means for the marker support, operating means for the marker moving mechanism, a shaft extending transversely of the gage and ruling mechanism, and devices mounted on the shaft for respectively actuating the operating means for the gage, the marker support and the marker moving mechanism.

19. In a ruling machine, the combination with ruling mechanism including a movable marker support and selective marker moving mechanism, of a gage, means for moving the work from the gage to the ruling mechanism, rocker arms for the gage, the marker support and the marker moving mechanism, a shaft extending transversely of the gage and ruling mechanism, and cams on the shaft respectively operating the rocker arms.

20. In a ruling machine, the combination with a plurality of movable ruling mechanisms, of a movable gage, an operating means for the gage, an operating means for each ruling mechanism, said means being substantially duplicates and correspondingly arranged with relation to their respective ruling mechanisms, and relatively fixed actuating devices for the several operating means each being located in substantially the same relation to its ruling mechanism as the others are to their respective ruling mechanisms.

21. In a ruling machine, the combination with a plurality of movable ruling mechanisms, of a movable gage, an operating means for the gage located at one end thereof, an operating means for each ruling mechanism located adjacent to one end thereof, a driving shaft having portions adjacent to the said ends of the gage and ruling mechanisms, and devices fixed thereon for respectively actuating the several operating devices.

22. In a ruling machine, the combination with a plurality of movable ruling mechanisms, of a movable gage, rocker arms for moving the gage and the ruling mechanisms, a driving shaft disposed transversely of the gage and ruling mechanisms, and cam elements on the shaft respectively operating the rocker arms.

23. In a ruling machine, the combination with ruling mechanism, including a movable marker support and selective marker moving means, of a movable gage, rocker arms for moving said support, said moving means and gage, a shaft extending transversely of the ruling mechanism and gage, and cams on the shaft for operating the rocker arms.

24. In a ruling machine, the combination with ruling mechanism including a pivotally mounted marker support and a pivotally mounted selective marker moving means, of a pivotally mounted gage, swinging rocker arms for moving said support, said moving means and gage, a shaft extending transversely of the ruling mechanism and gage, and cams on the shaft for operating the rocker arms.

25. In a ruling machine, the combination with ruling mechanism including a movable marker support and selective marker moving means, of a pivotally mounted gage, a plurality of ruling mechanisms, each including a pivotally mounted marker support, a plurality of rock shafts, marker moving devices mounted on the rock shafts, rocker arms for the gage, the marker supports and the rock shafts, a driving shaft, and cams thereon for actuating the rocker arms.

26. In a ruling machine, the combination with movable ruling mechanism, of a movable gage, means for conveying the work from the gage to the ruling mechanism, driving means for the gage, the conveying means and the ruling mechanism, including an initial driving member, a clutch for connecting and disconnecting the initial driving member and driving means, and operating means for the clutch extending along the conveying means.

27. In a ruling machine, the combination with movable ruling mechanism, of a movable gage, means for conveying the work from the gage to the ruling mechanism, driving means for the gage, the conveying means and the ruling mechanism, including an initial driving member, a clutch for connecting and disconnecting the initial driving member and driving means, and an operating rock shaft for the clutch extending longitudinally of the conveying means and transversely of the gage and ruling mechanism.

28. In a ruling machine, the combination with a rock shaft, of a marker support, means for mounting the support on the rock shaft to permit the support to be bodily adjusted longitudinally along the rock shaft, and means for moving the rock shaft to thereby move the marker support.

29. In a ruling machine, the combination with work conveying means, of a rock shaft disposed transversely thereof, and a marker support having clamps embracing the rock shaft, said clamps permitting the shifting of the marker support longitudinally of the shaft and transversely of the work conveying means to different positions on the shaft.

30. In a ruling machine, the combination with work conveying means, of a marker support comprising a beam having a pen holder receiving socket, a clamping cam shaft operating in the socket, and means for turning the shaft.

31. In a ruling machine, the combination with work conveying means, of a marker support comprising a beam having a longitudinally disposed holder receiving socket, a clamping cam shaft journaled at one side of the socket and operating therein, and an operating device for the shaft at one end of the beam.

32. In a ruling machine, the combination with work conveying means, of a marker support comprising a pivotally mounted beam having a longitudinally slot in one edge, a pen holding bar having a longitudinally tongue that engages in the slot, a cam shaft journaled along the slot and operating against the tongue, a gear on one end of the shaft, and an actuating shaft journaled on the beam and having a gear in mesh with the cam shaft gear.

33. In a ruling machine, the combination with a marker supporting rock shaft, of a pintle for one end of the rock shaft slidably telescoping therewith, and means engaged with the other end of the rock shaft.

34. In a ruling machine, the combination with a marker supporting rock shaft, of a pintle for one end of the rock shaft slidably telescoping therewith, a ball and socket mounting for the outer end of the pintle, an adjusting screw having a ball and socket connection with the opposite end of the shaft, and relatively adjustable supports for the said ball and socket mounting and the adjusting screw.

35. In a ruling machine, the combination with work conveying means, of ruling mechanism including a marker support, a ball and socket mounting for one end of the support, and a slidable mounting having a ball and socket connection with the other end of the support.

36. In a ruling machine, the combination with a work conveying means, of marker supporting means thereover, relatively adjustable spaced supports for the marker supporting means at opposite sides of the work conveying means, and mountings for the marker supporting means on said supports and including a universal joint in vertical line with one of the supports.

37. In a ruling machine, the combination with work conveying means, of ruling mechanism including a marker support cooperating with the conveying means, a standard, a boxing slidably mounted on the standard, a vertical adjusting screw connecting the standard and boxing, and a bearing screw in the boxing having a ball and socket connection with the marker support.

38. In a ruling machine, the combination with a marker support, of an extensible and contractile rock shaft member carrying the marker support, and relatively adjustable mountings for the rock shaft member having ball and socket connections with the terminals of said rock shaft member.

39. In a ruling machine, the combination with work conveying means, of ruling mechanism including a marker supporting beam, a shaft on which the beam is mounted, said shaft having a socket in one end, a supporting pintle slidably engaged in the socket, and a supporting and adjusting screw engaged with the other end of the shaft.

40. In a ruling machine, the combination with work conveying means, of ruling mechanism including a marker support, standards adjustably located on opposite sides of the work conveying means, a mounting for one end of the marker support slidably engaged with the same and having a ball and socket connection with one standard, and an adjusting screw mounted on the other standard and having a ball and socket connection with the marker support.

41. In a ruling machine, the combination with work conveying means, of ruling mechanism including a marking device, means for moving said marking device including an actuated element and an actuating element for periodically operating the same, mountings for the elements, and means for effecting a relative adjustment between the mountings for the elements to vary the periodicity of operation of the actuated element.

42. In a ruling machine, the combination with work conveying means, of ruling mechanism including a marking device, means for moving said marking device including an actuated element and an actuating element for periodically operating the same, mountings for said elements, and means for effecting an adjustment of the mounting of the actuated element with respect to the mounting of the actuating element to vary the time of operation of the actuated element by the actuating element.

43. In a ruling machine, the combination with work conveying means, of ruling mechanism, including a marking device, means for moving said marking device including a cam and an element periodically actuated by the cam, and a mounting on which the element is movably supported, said mounting being also movable to permit the element being shifted with respect to the cam to vary the time of operation of the element.

44. In a ruling machine, the combination with work conveying means, of ruling mechanism including a marking device, means for moving said marking device including a cam and a rocker arm periodically actuated by the cam, and a slidably mounted support on which the rocker arm is pivotally mounted that permits the shifting of said arm with respect to the cam.

45. In a ruling machine, the combination with work conveying means, of ruling mechanism, including a marking device, means for moving said marking device including a cam and a rocker arm periodically actuated by the cam, a base, a support for the rocker arm slidably mounted on the base, and an adjusting screw connection between the base and support.

46. In a ruling machine, the combination with ruling mechanism, including a marking device, of means for moving said device, including cooperating swinging arms having pivot axes located in different and angularly related planes, means connected with one of the arms for effecting the movement of the marking device, and means for periodically actuating the other arm.

47. In a ruling machine, the combination with ruling mechanism, including a marking device, of means for moving said device, including cooperating swinging arms, a bearing element carried by one arm and engaged by the other, said bearing element being adjustable to hold the arms different distances apart, means connected with one of the arms for effecting the movement of the marking device, and means for periodically actuating the other arm.

48. In a ruling machine, the combination with ruling mechanism, including a marking device, of means for moving said device, including a rock shaft, and means carried thereby for moving the marking device, a crank arm carried by the rock shaft, a rocker arm for actuating the crank arm, an adjustable bearing between the rocker arm and crank arm for holding them different distances apart, and a cam for operating the rocker arm.

49. In a ruling machine, the combination with ruling mechanism, including a marking device, of means for moving said device, including swinging arms, having pivot axes located in different and angularly related planes, one being operated by the other, means connected with one of the arms for moving the marker device, and actuating means engaged with the other arm.

50. In a ruling machine, the combination with ruling mechanism, including a marking device, of means for moving said device, including a rock shaft and means carried thereby for moving the marking device, a crank arm mounted on the rock shaft a rocker arm for actuating the crank arm, and disposed in angular relation to said crank arm, and a cam for operating the rocker arm having its axis of rotation transverse to the axis of rotation of the rock shaft.

51. In a ruling machine, the combination with ruling mechanism, including a marking device, of means for moving said device, including cooperating swinging arms, means connected with one of the arms for moving the marking device, means for periodically actuating the other arm, and a mounting that carries one of the arms and is bodily adjustable with said arm to shift the same with respect to the other arm.

52. In a ruling machine, the combination with ruling mechanism, including a marking device, of means for moving said device, including cooperating swinging arms, means connected with one of the arms for moving the marking device, a cam for periodically actuating the other arm, a mounting on which the latter arm is movably mounted, and means for shifting the mounting and latter arm with respect to the cam to vary the time of movement of said arm, while maintaining the cooperative relation between the arms.

53. In a ruling machine, the combination with ruling mechanism, including a marking device, of means for moving said device, including a rock shaft, a crank arm carried by the shaft, a rocker arm cooperating with the crank arm and disposed in angular relation thereto, an adjustable support on which the rocker arm is pivotally mounted, shiftable bearings between the arms, and a cam operating on the rocker arm to periodically move the same.

54. In a ruling machine, the combination with ruling mechanism, including a marking device, of means for moving said device, including a rock shaft, a crank arm carried by the shaft, a rocker arm cooperating with the crank arm and disposed in angular relation thereto, an adjustable support for the rocker arm, a bearing surface on one arm, an adjusting screw carried by the other arm and shiftably engaged with the bearing surface, and a cam operating on the rocker arm.

55. In a ruling machine, the combination with ruling mechanism, including a marking device, of a mounting for the marking device, means for effecting the movement of the marking device in opposite directions, including a pivotally mounted rocker arm, and friction means engaging the pivotal mounting of the rocker arm for governing the movement of the marking device in one direction.

56. In a ruling machine, the combination with work-conveying means, of ruling mechanism, including a marking device movable toward and from the work conveying means, means for periodically moving the marking device away from the conveying means, including a swinging rocker arm having a pivot mounting, and means engaging the pivot mounting for placing a variable amount of friction upon said pivot mounting to govern the movement of the marking device toward the conveying means.

57. In a ruling machine, the combination with work conveying means, of ruling mechanism, including a marking device movable toward and from the work conveying means, means for periodically moving the marking device away from the conveying means, including a swinging rocker arm having a pivot pin to which it is fixed, a bearing support for said pivot, including a split friction collar embracing the pivot pin, and means for contracting the collar upon the pivot pin.

58. In a ruling machine, the combination with work conveying means, of a swinging marker support movable toward and from the work conveying means, swinging arms disposed in angular relation to each other and operating one on the other for moving the support in one direction, a cam engaging one of the arms for effecting such movement, a spring for moving the support in the opposite direction, and friction means operating on one of the arms for resisting the action of the spring.

59. In a ruling machine, the combination with ruling mechanism, including a rock shaft and a swinging marker support adjustably mounted on the rock shaft, of an operating arm pivotally mounted on the rock shaft, means for fixing the arm against movement on the support and in different relations with respect thereto, and means for swinging the arm.

60. In a ruling machine, the combination with ruling mechanism, including a rock shaft and a swinging marker support mounted on the rock shaft, of a bearing member mounted on one end of the rock shaft, another bearing member engaged with said first bearing member, an operating arm pivoted on the first bearing member, and adjusting screws between the arm and first bearing member on opposite sides of the pivot axis of the arm, and means for periodically swinging the arm.

61. In a ruling machine, the combination with a pen supporting beam, of a rock shaft supporting the same, a sleeve fixed on one end of the rock shaft, a mounting for the shaft engaged with the end of the sleeve, a crank arm pivoted between its ends on the sleeve, adjusting screws between the arm and sleeve on opposite sides of the pivot axis, and means for swinging the arm.

62. In a ruling machine, the combination with a rock shaft, of a pen supporting beam longitudinally adjustable thereon, adjustable standards located at the ends of the rock shaft, a ball and socket mounting between the ends of the rock shaft and the standards, a crank arm pivotally mounted on the rock shaft, means for holding the crank arm against its pivotal movement and in different positions, a rocker arm, an adjustable bearing between the crank arm and rocker arm, a cam operating on the rocker arm, and means for shifting the rocker arm with respect to the cam.

63. In a ruling machine, the combination with supporting means for a plurality of marking devices, of means for selectively moving certain of the marking devices mounted on the supporting means, including a rock shaft and marker engaging devices carried by the rock shaft, a crank arm on one end of the rock shaft, a rocker arm for operating the crank arm located adjacent to the said end of the rock shaft, and a cam for actuating the rocker arm and also located adjacent to the said end of the rock shaft.

64. In a ruling machine, the combination with supporting means for a plurality of marking devices, of means for selectively moving certain of the marking devices mounted on the supporting means, including a rock shaft and marker engaging devices carried by the rock shaft, a crank arm on the rock shaft, a rocker arm disposed longitudinally of the rock shaft and operating on the crank arm, and an actuating shaft disposed transversely of the rock shaft and having a cam that operates on the rocker arm.

65. In a ruling machine, the combination with supporting means for a plurality of marking devices, of means for selectively moving certain of the marking devices mounted on the supporting means, including a rock shaft and marker engaging devices carried by the rock shaft, a crank arm on the rock shaft, a rocker arm disposed longitudinally of the rock shaft and operating on the crank arm, an actuating shaft disposed transversely to the rock shaft and having a cam that operates on the rocker arm, and means for shifting the rocker arm with respect to the cam while maintaining the coactive relation between the two arms.

66. In a ruling machine, the combination with supporting means for a plurality of marking devices, of means for selectively moving certain of the marking devices, including a plurality of rock shafts, and elements carried thereby for selectively engaging the marking devices, crank arms carried by the rock shafts, rocker arms for respectively operating the crank arms, cam means for actuating the rocker arms, and a common support for the rocker arms adjustable to vary the position of the rocker arms with respect to the cam means.

67. In a ruling machine, the combination with a beam for supporting a plurality of ruling pens, of a rock shaft journaled alongside the beam, a plurality of collars slidable on the rock shaft and having means for fixing them at different positions thereon, said collars having transversely disposed sockets, pen engaging devices having stems adjustable on the sockets, a crank arm carried by the shaft, a slidable support, and means for adjusting the same, a rocker arm pivoted on the support, an adjustable bearing between the rocker arm and crank arm, an adjustable stop for the rocker arm, an operating shaft extending transversely to the beam and rock shaft, and a cam thereon for operating the rocker shaft.

68. In a ruling machine, the combination with an elongated supporting frame, of work-conveying means operating longitudinally thereof, a movable gate and a movable pen beam mounted transversely of the frame and work conveying means and cooperating with the latter, and operating devices for the gate and pen beam respectively and mounted on one side of the frame adjacent to said gate and pen beam.

69. In a ruling machine, the combination with an elongated supporting frame including a longitudinal side bar, operating devices for the gate mounted on said side bar adjacent to said gate, operating devices for the pen beam mounted on said side bar adjacent to the said pen beam, and relatively fixed actuating means for said devices located alongside the beam.

70. In a ruling machine, the combination with an elongated supporting frame including a longitudinal side bar, operating devices for the gate mounted on said side bar adjacent to said gate, operating devices for the pen beam mounted on said side bar adjacent to the said pen beam, a shaft extending longitudinally of the side bar, and cams on the shaft and actuating said devices.

71. In a ruling machine, the combination with an elongated supporting frame, including a side bar, of a work conveying belt operating longitudinally of the frame, a movable gate mounted transversely of the frame and belt at one end of the former and having a crank arm, a plurality of pen beams movably mounted on the frame transversely of the belt, and having crank arms, a rocker arm for each crank arm adjustably mounted on the side bar, means available at the adjacent side of the frame for effecting the adjustment of the rocker arm mountings, and cams operating on the respective rocker arms.

In testimony whereof I affix my signature in the presence of two witnesses.

ALBERT BROADMEYER.

Witnesses:
A. E. KARMANY,
E. EARLE UNGER.